Dec. 1, 1964     D. B. SPALDING     3,159,002

PRESSURE EXCHANGERS

Filed Jan. 4, 1962     2 Sheets-Sheet 1

United States Patent Office 3,159,002
Patented Dec. 1, 1964

3,159,002
PRESSURE EXCHANGERS
Dudley Brian Spalding, 2 Vineyard Hill Road,
London SW. 19, England
Filed Jan. 4, 1962, Ser. No. 163,998
Claims priority, application Great Britain Jan. 23, 1961
5 Claims. (Cl. 60—39.45)

This invention relates to pressure exchangers and to plant incorporating such pressure exchangers.

A pressure exchanger comprises cells in which one gas quantity expands so compressing another gas quantity with which it is in direct contact, ducting to lead fluid at different pressures substantially steadily to and from the cells, and means to effect relative motion between the cells and the ducting. The cells of a pressure exchanger are customarily arranged as a cell ring and this cell ring is rotatable relative to the ducting.

In pressure exchanger plant concerned both with producing an output of high-temperature fluid and an output of low-temperature fluid, mixing of fluid at different temperatures is disadvantageous and reduces the thermal efficiency of the plant. An object of this invention is to arrange the plant in such a manner that the degree of mixing and interchange of heat between fluid in the cells of the pressure exchanger is reduced.

According to the present invention a pressure exchanger plant operable to produce an output of high-temperature fluid and an output of low-temperature fluid includes cell ring means comprising at least one cell ring including a plurality of cells, end-plate structure at each end of the cell ring effective to close off the ends of the cells but having ports therein for the admission of fluid to and the extraction of fluid from the cells, means to effect rotation of the cell ring relative to the end-plate structure, the cell ring means having a high-temperature high-pressure compression stage, a high-temperature low-pressure scavenging stage, a low-temperature high-pressure compression stage and a low-temperature low-pressure scavenging stage, each one of said compression and scavenging stages including a port for the admission of fluid to the cells and a port for the extraction of fluid from the cells, ducting to connect the outlet port of the high-temperature high-pressure compression stage to the inlet port of the low-temperature high-pressure compression stage, cooling means interposed in said ducting, further ducting to connect the outlet port of the low-temperature high-pressure compression stage to the inlet port of the high-temperature high-pressure compression stage, heating means interposed in said further ducting, the high-temperature high-pressure compression stage being sequential to and preceding the high-temperature low-pressure scavenging stage and the low-temperature high-pressure compression stage being sequential to and preceding the low-temperature low-pressure scavenging stage in the direction of rotation of the cell ring means relative to the end-plate structure.

Embodiments of the invention will now be described by way of example with reference to the accompanying diagrammatic drawings, in which.

Figure 1:
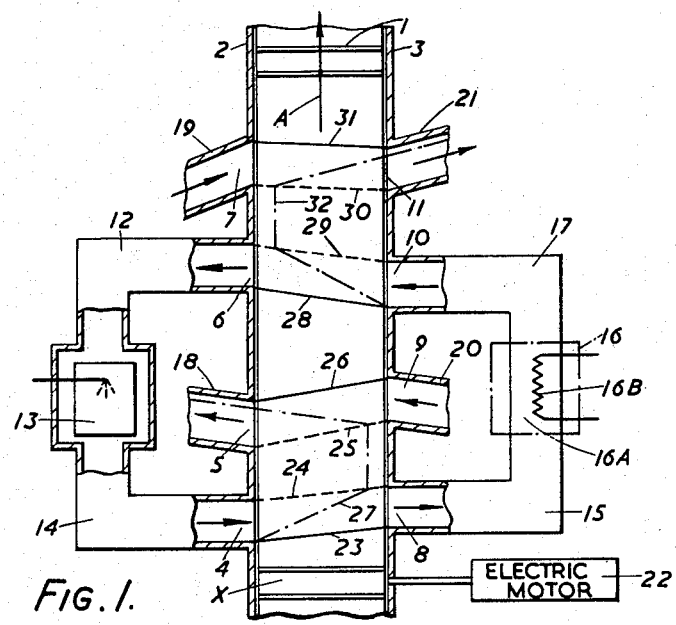
FIGURE 1 is a developed view of a pressure exchanger plant in accordance with the invention.

FIGURE 1 of the drawings, illustrates a pressure exchanger plant having cell ring means comprising a single cell ring. The cell ring has a plurality of cells 1 and is rotatable in the direction indicated by an arrow A. Only a few of the cell walls are shown in order that wave processes and particle paths within the cells can be illustrated clearly. End-plates 2, 3 are disposed one adjacent each end of the cell ring. The end-plate 2 has ports 4, 5, 6 and 7 and the end-plate 3 has ports 8, 9, 10 and 11. The ports 4, 7, 9 and 10 are inlet ports and the ports 5, 6, 8 and 11 are outlet ports. The outlet port 6 and the inlet port 4 communicate with one another via a duct 12, a combustion chamber 13 and a duct 14. The outlet port 8 is connected via a duct 15 to a heat-exchanger 16 having a hot-pass 16A and a cold pass 16B. The hot-pass 16A of the heat-exchanger 16 communicates via a duct 17 with the inlet port 10. A high-temperature high-pressure compression stage of the pressure exchanger includes the inlet port 4, the outlet port 8 and cells at any one time in communication with these ports. A low-temperature high-pressure compression stage of the pressure exchanger includes the inlet port 10, the outlet port 6 and cells at any one time in communication with these ports. Ducts corresponding to the ports 5, 7 and 9, 11 are referenced 18, 19, 20 and 21 respectively. A high-temperature low-pressure scavenging stage of the pressure exchanger includes the ports 9, 5 and cells at any one time in communication with these ports. A low-temperature low-pressure scavenging stage of the pressure exchanger includes the ports 7, 11 and cells at any one time in communication with these ports. Relative rotation between the cells 1 and the end-plates 2 and 3 is effected by an electric motor 22.

Compression waves within the cells are indicated by full lines and expansion waves by broken lines. Demarcation lines between fluids within the cells are indicated by chain lines. In operation, the cells ring is rotated in the direction indicated by an arrow A by the electric motor 22. The cycle of compression and expansion processes which occurs in a given cell during one revolution of the cell ring will now be described commencing with the cell at a position X. On rotation of the cell ring the cell is opened to the high-temperature high-pressure compression stage inlet port 4 through which high-pressure combustion gases are admitted to the cell from the duct 14. Air already in the cell is compressed by means of these high-pressure gases and this air is expelled from the cell when the cell becomes open to the outlet port 8, whence it passes to the hot-pass 16A of the heat-exchanger 16. Compression of the air is effected by a compression wave 23 which travels across the cells from the opening edge of the port 4 to the opening edge of the port 8. As the cell leaves the high-temperature high-pressure compression stage the pressure of the combustion gases admitted through the port 4 is reduced to a value only slightly above atmospheric pressure, say 1.1 atmospheres, by passage through a series of expansion waves indicated diagrammatically by the single broken line 24. The combustion gases now at a lower pressure, but still at a fairly high-temperature, remain in the cell and are at rest until the cell becomes open to the outlet port 5 of the high-temperature low-pressure scavenging stage. The combustion gases pass through an expansion wave 25 and thence out of the cell through the port 5 into the duct 18. As a result of the motion of the combustion gases, the pressure within the cell is reduced and air at atmospheric pressure and temperature is drawn in through the duct 20 and the port 9 of the high-temperature low-pressure scavenging stage. The cell is thus again filled with air at a pressure and temperature slightly above atmospheric. This rise in pressure and temperature is brought about by a compression wave 26. A demarcation line 27 indicates the boundary in the cells between the combustion gases and fresh air. As the cell ring continues to rotate the cell is opened to the inlet port 10 of the low-temperature high-pressure compression stage, which admits cool relatively high-pressure air to the cell from the outlet of the heat-exchanger 16 via the duct 17. This high-pressure air serves to compress the fresh air drawn in through the duct 20 and the port 9 and the air thus compressed is delivered through the port 6 of the low-temperature high-pressure compression stage and the duct 12 to the combustion chamber 13 from whence combustion gases are admitted to the cells via the duct 14 and the port 4 as hereinbefore described. Compression of air admitted through the port 9 is effected by a compression wave 28 which travels across the cell from the opening edge of the port 10 to the opening edge of the port 6. As the cell leaves the low-temperature high-pressure compression stage the pressure of gases admitted through the port 10 is reduced to a value only slightly above atmospheric pressure, say 1.1 atmospheres, by passage through a series of expansion waves indicated by a single broken line 29. Following the closure of the cell to the port 6, air in the cell derived from the port 10 is at rest. As the cell ring continues to rotate, the cell comes into communication with the outlet port 11 of the low-temperature low-pressure scavenging stage through which air as a result of passage through an expansion wave 30 is finally delivered at a low temperature as a useful output through the duct 21. As a result of this gas flow, the pressure within the cells is reduced and air at atmospheric pressure and temperature is drawn into the cell via the duct 19 and the port 7. This atmospheric air is compressed to a value slightly above atmospheric pressure by a compression wave 31 and then remains at rest within the cell. A demarcation line 32 indicates the boundary in each cell between gases admitted through the port 10 and fresh air admitted through the port 7. The cell then reaches the position X after which the cycle of operation is continuously repeated.

Figure 2:
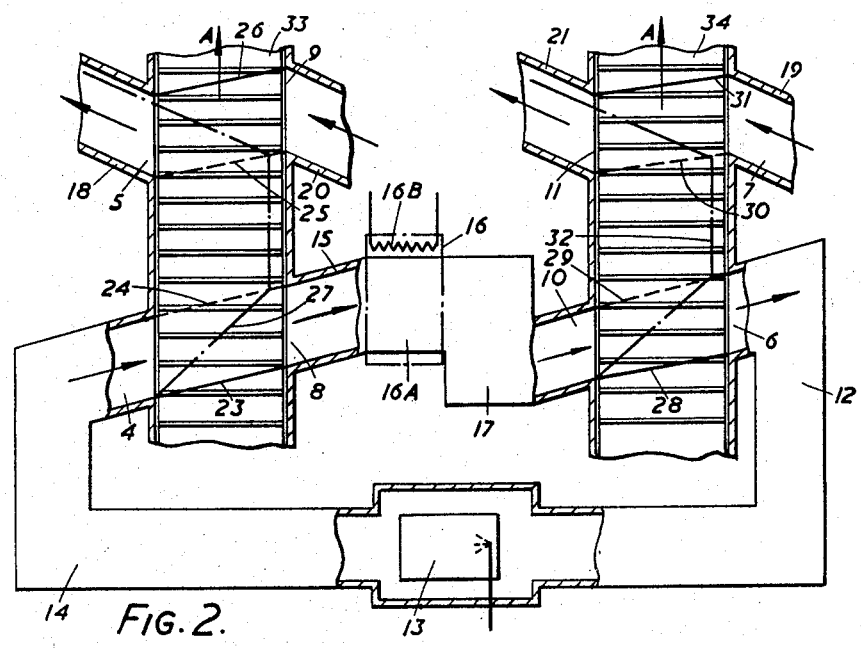
FIGURE 2 is a developed view of a further embodiment of a pressure exchanger plant in accordance with the invention.

The embodiment shown in FIGURE 2 is similar to that of FIGURE 1, except that the cell ring means comprises two cell rings 33, 34 and these are employed in place of the single cell ring of the embodiment of FIGURE 1. The same reference numerals are given to corresponding parts. The sequence of operation is identical to that of the embodiment of FIGURE 1.

Figure 3:
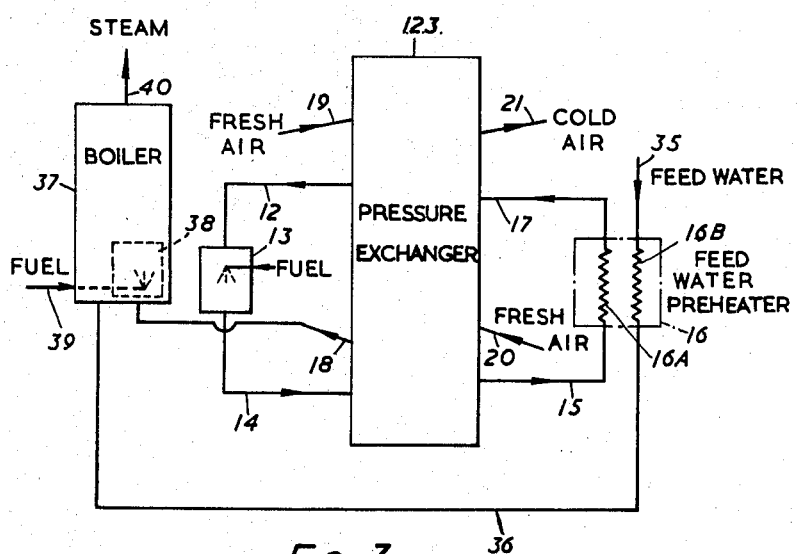
FIGURE 3 is a flow diagram of a plant for raising steam and producing low temperature air.

In the embodiment of FIGURE 3 which is a flow diagram of a steam-raising plant, the pressure exchanger is shown only as a box and is referenced 1, 2, 3. Where appropriate the duct connections are given the same references as in FIGURE 1. In this embodiment the heat-exchanger 16 serves as a feed water pre-heater for a boiler water is supplied to the inlet of the cold pass 16B of the heat-exchanger 16 through a duct 35. Warm water from the outlet of the cold pass 16B of the heat-exchanger flows through a duct 36 to a boiler 37. A pipe 39 serves to supply fuel to the furnace 38 of the boiler 37. Hot combustion gases from the duct 18 which still contain an appreciable amount of oxygen are fed to the furnace 38 of the boiler 37 and in a conventional manner the combustion gases serve to generate steam which leaves the boiler through a duct 40.

In operation, the pressure exchanger part of the plant of FIGURE 3 functions in exactly the same manner as the pressure exchanger plant illustrated in FIGURE 1 or FIGURE 2. Water enters the cold pass 16B of the pre-heater 16 and extracts heat from gases passing through the hot pass 16A. The warm water then flows through the duct 36 to the boiler 37, in which it is converted to steam by hot gases from the furnace 38. The furnace receives a mixture of hot air and combustion gases from the outlet duct 18 of the higher-temperature low-pressure scavenging stage of the pressure exchanger. Steam leaves the boiler 37 via the duct 40 and a useful supply of cold air leaves the pressure exchanger via the duct 21.

Figure 4:
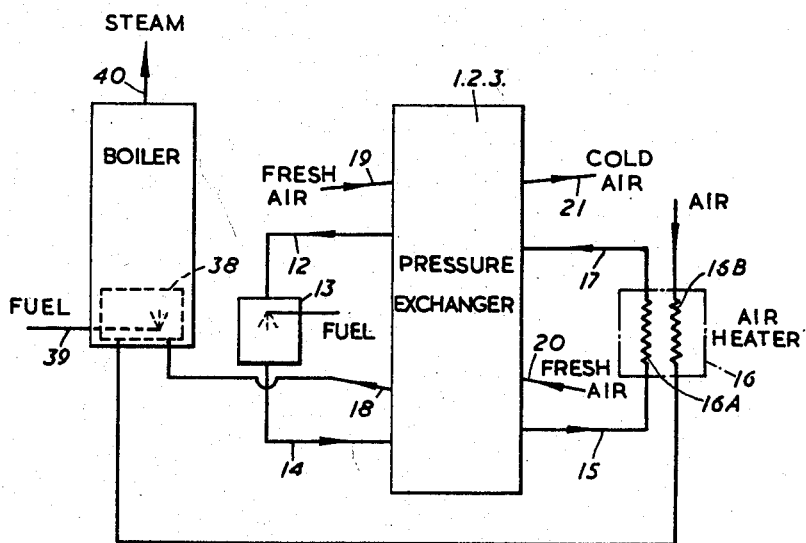
FIGURE 4 is a diagram of a plant generally similar to that of FIGURE 3.

The embodiment of FIGURE 4 is similar to that of FIGURE 3, but the water pre-heater is replaced by an air heater. A duct 41 is connected from the outlet of the cold pass 16B of the air heater to the boiler furnace 38.

In operation, heated air from the air heater is mixed with combustion gases from the outlet duct 18 of the high-temperature low-pressure scavenging stage of the pressure exchanger the mixture serving to sustain combustion in the furnace. Steam is generated in the boiler in conventional manner and an output of cold air is available at the duct 21.

I claim:

1. Pressure exchanger plant operable to produce an output of high-temperature fluid and an output of low-temperature fluid, the plant including cell ring means comprising at least one cell ring including a plurality of cells, end-plate structure at each end of the cell ring effective to close off the ends of the cells but having ports therein for the admission of fluid to and the extraction of fluid from the cells, means to effect rotation of the cell ring relative to the end-plate structure, the cell ring means having a high-temperature high-pressure compression stage, a high-temperature low-pressure scavenging stage, a low-temperature high-pressure compression stage and a low-temperature low-pressure scavenging stage, each one of said compression and scavenging stages including a port for the admission of fluid to the cells and a port for the extraction of fluid from the cells, ducting to connect the outlet port of the high-temperature high-pressure compression stage to the inlet port of the low-temperature high-pressure compression stage, cooling means interposed in said ducting, further ducting to connect the outlet port of the low-temperature high-pressure compression stage to the inlet port of the high-temperature high-pressure compression stage, heating means interposed in said further ducting, the high-temperature high-pressure compression stage being sequential to and preceding the high-temperature low-pressure scavenging stage and the low-temperature high-pressure compression stage being sequential to and preceding the low-temperature low-pressure scavenging stage in the direction of rotation of the cell ring means relative to the end-plate structure.

2. Pressure exchanger plant operable to produce an output of high-temperature fluid and an output of low-temperature fluid, the plant including two cell rings, each cell ring including a plurality of cells, end-plate structure at each end of each cell ring effective to close off the ends of the cells but having ports therein for the admission of fluid to and the extraction of fluid from the cells, means to effect rotation of each cell ring relative to the end-plate structures, one of said cell rings including a high-temperature high-pressure compression stage and a high-temperature low-pressure scavenging stage, the other cell ring including a low-temperature high-pressure compression stage and a low-temperature low-pressure scavenging stage, each one of said compression and scavenging stages including a port for the admission of fluid to the cells and a port for the extraction of fluid from the cells, ducting to connect the outlet port of the high-temperature high-pressure compression stage of the said one cell ring to the inlet port of the low-temperature high-pressure compression stage of the said other cell ring, cooling means interposed in said ducting, and further ducting to connect the outlet port of the low-temperature high-pressure compression stage of the said other cell ring to the inlet port of the high-temperature high-pressure compression stage of the said one cell ring, heating means interposed in said further ducting.

3. Pressure exchanger plant as claimed in claim 1, in which the cooling means is a heat-exchanger serving as a feed water pre-heater for a boiler.

4. Pressure exchanger plant as claimed in claim 1, in which the cooling means is a heat-exchanger serving as an air heater for boiler furnace combustion air.

5. Pressure exchanger plant as claimed in claim 1, in which the heating means is a combustion chamber, the combustion gases from which, after introduction to the cells through the inlet port of the high-temperature high-pressure compression stage, leave the cells through the outlet port of the high-temperature low-pressure scavenging stage and pass to the furnace of a boiler.

References Cited in the file of this patent

UNITED STATES PATENTS 2,848,871    Jendrassik _____ Aug. 26, 1958

FOREIGN PATENTS 792,858    Great Britain _____ Apr. 2, 1958